United States Patent [19]

de Buda

[11] Patent Number: 4,656,150
[45] Date of Patent: Apr. 7, 1987

[54] TREATMENT OF SERICITIC CLAYS TO PRODUCE AN ADSORBENT, ABSORBENT PRODUCT

[75] Inventor: Francis de Buda, Santa Barbara, Calif.

[73] Assignee: John A. Stephens, Santa Barbara, Calif.

[21] Appl. No.: 562,425

[22] Filed: Dec. 16, 1983

[51] Int. Cl.$^4$ .......................... B01J 20/12; B01J 20/30
[52] U.S. Cl. ........................................ 502/83; 502/408
[58] Field of Search .................... 502/408, 83, 233, 81

[56] References Cited

U.S. PATENT DOCUMENTS

| | | | |
|---|---|---|---|
| 1,555,639 | 9/1925 | Day | 502/408 |
| 1,913,960 | 6/1933 | Roll | 502/83 |
| 1,932,832 | 10/1933 | Turrentine | 502/408 |
| 2,027,948 | 1/1936 | Wollner et al. | 502/408 |
| 2,484,828 | 10/1949 | Hickey | 502/83 |
| 2,495,751 | 1/1950 | Mills et al. | 502/83 X |
| 2,553,239 | 5/1951 | Christiansen | 502/81 |
| 2,991,170 | 7/1961 | Szepesi et al. | 502/408 X |
| 3,029,783 | 4/1962 | Sawyer, Jr. et al. | 502/83 X |

FOREIGN PATENT DOCUMENTS 494234 7/1953 Canada ............................. 502/408

Primary Examiner—Carl F. Dees
Attorney, Agent, or Firm—Edward D. O'Brian; K. H. Boswell

[57] ABSTRACT

An adsorbent, absorbent product can be produced from sericitic clays by removing alumina values from such clays with a mineral acid, removing oil contaminants from such clay with a solvent or solvent mixture and removing amorphous silica from them with a caustic solution. The particles of the clay are dried after treatment in these manners. They are then ready to use.

4 Claims, 1 Drawing Figure

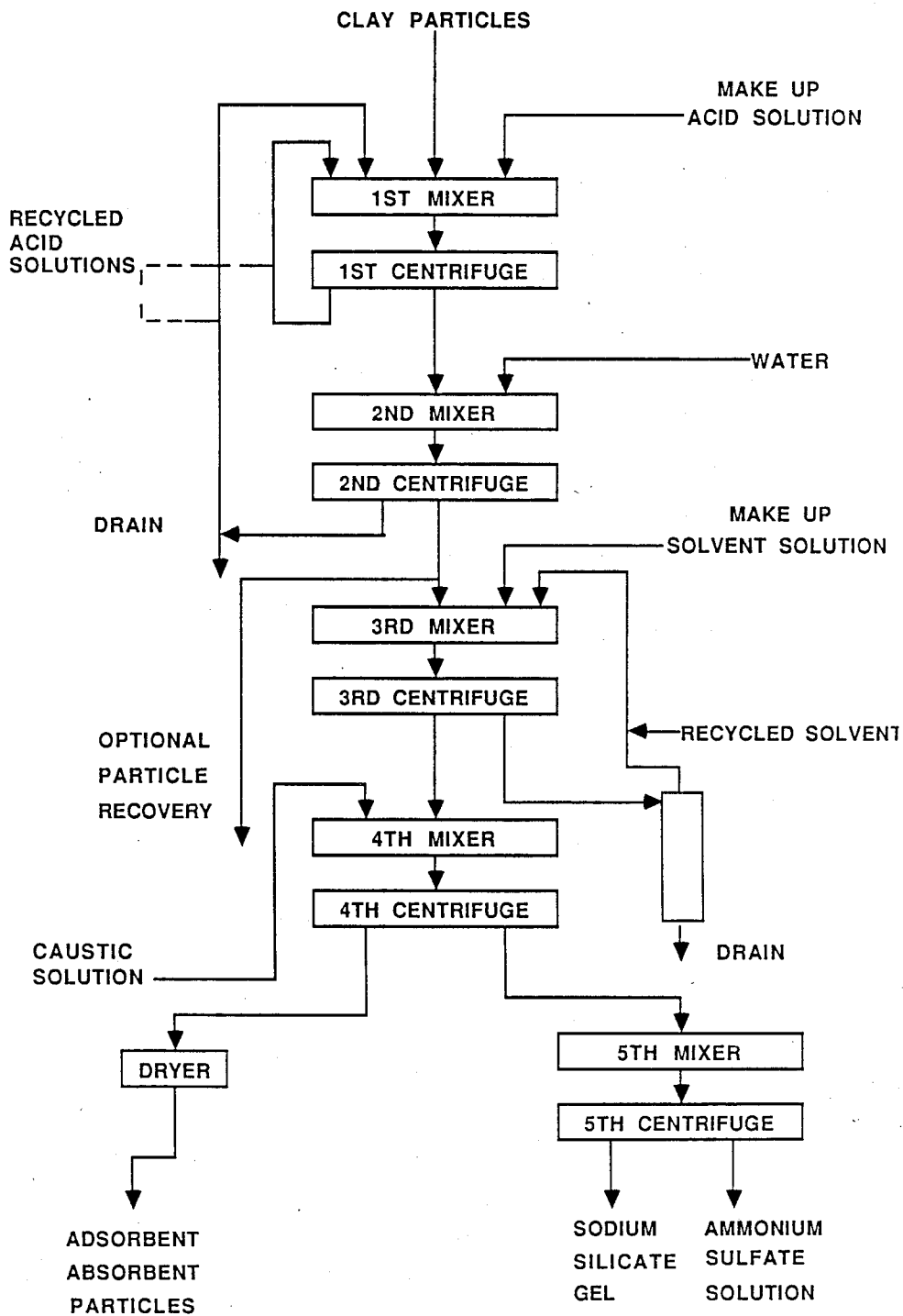

TREATMENT OF SERICITIC CLAYS TO PRODUCE AN ADSORBENT, ABSORBENT PRODUCT

BACKGROUND OF THE INVENTION

This invention relates to the treatment of sericitic clays so as to produce an absorbent, adsorbent product having ion exchange capabilities or characteristics.

Two separate, different factors are especially important in connection with this invention. The first is the recognition of the fact that there is a continuing commercial demand or need for adsorbent and absorbent materials which are comparatively inexpensive in terms of what can be accomplished as a result of their use. Such materials are widely used for a variety of purposes such as, for example, in decoloring various different types of oils. The second of these factors relates to the recognition that what are now considered to be waste sericitic clay particles can be economically processed so as to provide an adsorbent and absorbent material capable of being utilized in fullfilling or satisfying this commercial need.

The sericitic clays referred to in this discussion are micaceous minerals normally containing a small amount of montmorillonitic-type material. The latter is not normally a true or traditional montmorillonite in that it does not have expansion characteristics on glycolation of montmorillonite. Clays of this type are mined in the San Joaquin Valley of California in the vicinity of various towns such as Taft, McKittrick and various others which are reasonably adjacent to the latter. A typical analysis of a sericitic clay of the type noted herein which is commonly utilized as cat litter, is as follows:

| | |
|---|---|
| Silica | 80.40% |
| Aluminum Oxide | 9.48% |
| Iron Oxide | 0.88% |
| Calcium Oxide | 0.20% |
| Magnesium Oxide | 0.54% |
| Sodium & Potassium Oxides | 0.15% |
| Loss on ignition (largely combined water) | 8.35% |
| | 100.00% |

The composition of any such clay will normally vary throughout a deposit. Generally speaking, the deposit from which the sample upon which this analysis was obtained will not vary to such an extent as to gain either more or less than 10% more or less than any of the various ingredients specified except water. In this type of sericitic clay there will normally be cristobalite as an impurity within the sericitic material and a comparatively limited or minor amount of opaline quartz will normally be present. In general, approximately 40-60% by weight—normally about 50% by weight—of a quantity of this mineral will consist of amorphous silica which may be easily solubilized.

This silica will either be uncombined or will be combined so loosely with various other oxides that it can be extracted with the same methods as are applicable to the removal of purely uncombined silica or will be present in zeolitic type complexes. The alumina within a clay deposit of this sericitic type will also normally consist of both aluminum oxide which is uncombined or combined loosely with other oxides in compounds of such a character that it is capable of reacting as uncombined alumina or will be present within various complex zeolitic type compounds—normally silicates—which will usually contain various other ingredients such as magnesia, calcium oxide, iron oxide(s) and sodium or potassium oxide.

Comparatively large volumes of so-called "fines"—comparatively small particles—of sericitic clays are in effect by-products of the mining of such clays and the subsequent processing of such clays for use as cat litter and various other related applications. This processing primarily consists of sizing and placing the various particles of the clay in the appropriate bags or sacks or other containers. In the past, it has been uneconomic to do anything with these fines even though, at least in theory, they have been capable of being utilized in various.

BRIEF SUMMARY OF THE INVENTION

The present invention is intended to avoid the economic waste associated with these fines. It is intended to provide a manner by which these fines can be utilized at a comparatively nominal economic cost to provide an adsorbent and absorbent material having ion exchange characteristics and properties and, when it is desired from an economic standpoint, to produce dried silica gel. The adsorbent, absorbent material of the present invention is intended to be and is in fact of such a character that it can effectively be utilized instead of various other known compositions for removing color and odor from various different types of oils and the like.

In accordance with this invention, these various objectives are achieved through the use of a process of treating sericitic clay fines as are by-products of the production of other products so as to produce an adsorbent, absorbent product having ion exchange activity by separately leaching the free or easily solubilized alumina from such fines, leaching soluble amorphous silica from such fines and by extracting such fines so as to remove an oily type contaminant which has been found to be present within such clays. The order of performing these various steps can be varied as subsequently discussed.

BRIEF DESCRIPTION OF THE DRAWING

Because of the nature of this invention, it is considered that it is best to explain it with reference to the accompanying drawing in which:

The FIGURE is a flow sheet indicating the preferred steps of a presently preferred manner of carrying out the process of this invention so as to produce a desired product.

DETAILED DESCRIPTION

In the presently preferred manner of carrying out this invention either fines of a sericitic clay having a chemical composition corresponding to that given in the preceding discussion or fines of a related sericitic clay can be utilized. In general, the smaller the particles of these fines the better in connection with the process of this invention. This is because the smaller the fines used the greater the surface area of the fines per unit of weight. This in turn facilitates the removal of various materials as hereinafter indicated from them. It is considered that particles of −150 mesh standard Tyler screen size can be effectively utilized in practicing this invention but that the subsequent removal of various materials from these fines will be expedited if they are −325 mesh standard screen size. Hence, it is preferred that they should be of the latter size.

In carrying out the process of this invention, these fines are preferably first mixed with an aqueous solution of a mineral acid which is of such a concentration as to be capable of placing in the solution substantially all free or loosely combined alumina within these fines without attacking other components of these fines to any noticeable extent at the temperature of the process mixture. If the latter temperature is too low, removal of the alumina will be uneconomically slow while if the latter is too high there is danger of the acid fumes causing unnecessary complications. As a result of this and as a consequence of the cost of heating a solution, it is considered preferable to carry out this first step of the process at a normal ambient temperature within the range of from about 18° C. to about 40° C.

A wide variety of different mineral acids at different concentrations can be used in connection with this first step. From an economic standpoint, it is considered preferable to use either sulfuric or hydrochloric acid because of the effectiveness of these acids and their relative costs and availability. When hydrochloric acid is used, it will normally convert the aluminum present to aluminum chloride and will tend to place in the solution minor amounts of ferrous oxide which are not firmly tied up in complex compounds. When sulfuric acid is used, the normal product will, of course, be aluminum sulfate. It is considered that preferred results are achieved with the use of a 6N solution of hydrochloric or 14.4N solution of sulfuric acid. Normally, effective results can be achieved by treating the particles with a solution containing from about 50 to about 90% by weight sulfuric acid or from about 12 to about 25% by weight hydrochloric acid.

The total volume of the mineral acid solution used should be sufficient so as to place substantially all of the $Al_2O_3$ present in the particles in solution. Since the precise removal of exactly all of the alumina values is not critical, it is considered preferable not to have to calculate this amount on a stoichmetric basis in practicing the process of the invention. As a practical matter, it is considered that effective removal of substantially all of the alumina can be achieved using at least 4 parts by volume of the acid solution per part by volume of the particles treated. Minor variations from this 80–20% ratio do not appear to be significantly detrimental. Because of this, it is considered acceptable to use from about 3.6 to about 4.4 volume of acid solution per volume of particles.

The various clay fines and the acid solution may be contacted with one another in any desired manner. As shown in the flow sheet they may be mixed together in a first conventional mixing vessel and then the resultant solution obtained may be centrifuged so as to obtain the resultant solids contaminated with a small quantity of process solution while the separated process solution is recycled to the first mixing vessel where it is admixed wth new acid solution to make up for the loss of solution carried forward with the solids. This mixture is preferably held in the mixer used for no longer than is reasonably necessary to place the various aluminum values listed in solution.

It is considered that a period which is effective for this purpose will normally vary from about 24 to about 72 hours depending upon various different variables as previously discussed. During this period, some salt may crystalline out on the particles present. This is not important since such salt will be removed during the subsequent washing step. The centrifuge should be used so as to obtain as high a degree of solid-liquid separation as possible without drying. Normally, some minor leaching will take place in the first centrifuge but this is so minor that it can be neglected.

The residue from this first extraction step carried out in both the first mixer and the first centrifuge is preferably washed through the use of a second mixer and then is preferably separated from the process solution through the use of a second centrifuge. Because of the nature of the operation performed in the second mixer, the amount of water employed in washing and the time of contact of the water with the processed particles are not critical so long as most of the remainder of the acid process solution entrained with the solids is removed by the second centrifuge.

This process solution will normally either be sent to drain as indicated or will be mixed with the recycled acid solution sent back to the first mixer. If desired, the alumina values in the liquid from this second centrifuge can be separately recovered in accordance with known processes but this is not considered to be economic. The solids from this second centrifuge may be separated and dried so as to yield an adsorbent, absorbent material which does not have these properties to a degree such as is normally desired.

Preferably, the process particles from the second centrifuge are mixed in a third mixer with either an organic solvent or solvent mixture for common mineral oils or with an aqueous solution of a water miscible solvent of this category such as common ethanol or a solution of a mixture of such solvents. The purpose of this is to remove traces of any oil contaminant which will normally be present within the clay. Although the temperature of this extraction can be varied between comparatively wide limits, it is considered desirable to carry it out within a normal ambient range as noted because effective removal can be achieved within this range and because it is economic to carry out this extraction at an ambient temperature. At a lower temperature the removal will be uneconomically slow while at a higher temperature there is a danger of the loss of the solvent.

The particular solvent chosen should be one which is effective for its intended purpose and which is relatively economical to use. It is considered that acceptable results are preferably achieved utilizing a 75% by weight aqueous solution by ethanol but that this can be varied to a comparatively large extent. Normally, the time required in this third mixer is, of course, related to the solvent used and the temperature of the solvent. Any amount of time effective for the intended purpose should normally be used. It is normally considered that a time period of from roughly one-half to one and a half hours is normally adequate.

The third centrifuge which receives the process mixture from the third mixer separates it into a mixture of particles and process solution and the solvent containing some minor amounts of oil. These latter can be conveniently separated using a conventional evaporator yielding a tarry residue and recycled solvent which can be added to the solvent supplied in the third mixer.

The particles from this third centrifuge are preferably mixed with a solution of an alkali which is sufficient so as to to place the amorphous silica present in solution. Because of its cost effectiveness and availability, only one alkali should be considered for use at this stage of the process—sodium hydroxide. It is, however, possible to also use potassium and lithium hydroxide instead of sodium hydroxide. The amount of sodium hydroxide used should be dependent upon the precise amorphous silica content of the process particles. The soda used should preferably be an amount equal to from at least 100% to about 150% of the amount necessary to react with the amorphous silica present so as to form a soluble sodium silicate composition. As a practical matter, this can be considered to be from 100 to 150% of the stoichmetric amount required to form sodium meta-silicate even though a mixture of silicates will normally be obtained.

This amount of soda should be used with just enough water to place both the soda present and the sodium silicate formed in solution. This solution will normally contain very minor amounts of potassium and lithium silicates because of the presence of very limited amounts of these metals in the particles. For convenience, these latter silicates are considered as sodium silicate. In general, if only the minimum amount of sodium hydroxide is used, there is danger that some amorphous silica will not be removed at this stage of the process and that, therefore, the desired properties will not be achieved in the final product. On the other hand, if an excess of sodium hydroxide is used, there will be an economic waste in that soda will be used which is not economically necessary in the process.

These factors have to be related to the fact that if a comparatively high concentration of soda is used substantially all of the amorphous silica values will be removed within a comparatively limited time period. It is considered preferable, at least from an economic standpoint, to carry out this portion of the process utilizing a boiling soda solution because this seems to expedite the recovery of the silica in a minimal amount of time.

This removal of silica during this stage—the fourth stage—of the process may be carried out utilizing a mixer which is jacketed with a conventional steam jacket or any other type of conventional reaction vessel. The fourth centrifuge used of course separates the treated particles from the process solution at this stage. The process solution may conveniently be treated in a known manner with sulfuric acid and ammonia in a fifth mixer so as to provide a somewhat gelled slurry containing ammonium sulfate and the silica gel. This mixture from this fifth mixer may be separated using a fifth centrifuge or any other known separater to provide a liquid fertilizer and a gel capable of being dried in accordance with conventional practice so as to produce a sodium silicate powder. If desired, the gel from this fifth centrifuge can be sold directly without being dried.

Normally, it will not be necessary to wash or leach this product before it is dried but in those cases where extreme purity may be required it may be advisable to wash it in the manner described in connection with the second mixer and centrifuge indicated in the preceding. The solids from the fourth centrifuge will normally be dried at a temperature which is sufficiently low so as not to affect the adsorbent, absorbent properties of these solids. It is considered that a temperature which is sufficiently low so that no removal of any chemically combined or bound water occurs. If this should happen, the properties of the final product will be detrimentally affected. It is considered preferable to use a temperature from within the range of about 100°–250° C.

The product resulting from this series of process steps may be directly utilized as an adsorbent or absorbent for many different purposes such as, for example, in "cleaning up" both mineral and vegetable oils. It is not considered necessary to list in this specification all of the various possible uses of this product. It is considered to be significantly more effective as an adsorbent, absorbent than prior related known products.

Since the mixer and the centrifuge are intended for the extraction of alumina values by leaching and the production of resultant processed fines, it is obvious that various known items of chemical engineering equipment can be substituted for them. Thus, such items as Pachuca tanks or Dorr agitators or thickeners can be utilized instead of the mixer shown. Also, a conventional filter can be substituted for the centrifuges noted.

The precise sequence of operation indicated in the preceding is considered desirable inasmuch as it eliminates the alumina values at an early stage in the process so as to avoid any substantial chance of such values causing contamination at a subsequent stage in the process. This early use of the acid is also preferable in that it seems to open up the particles or activate them in some way so as to expedite the oil removal. Further, it is considered preferable to extract the oil values from the particles prior to the treatment of such particles with the treatment of soda so as to remove silica because it is believed that this will contribute to the sodium silicate obtained having a relatively "clean", substantially uncolored appearance as a result of it not being contaminated by even trace amounts of the oil. In spite of these considerations, effective results can be achieved by varying the sequence of the various operations described.

I claim:

1. A process for treating sericitic clay particles containing alumina and amorphous silica containing oil contaminant so as to produce an adsorbent, absorbent inorganic product which comprises:
   said clay particles are of −325 mesh standard Tyler screen size,
   removing said alumina from said particles by leaching then with a sulfuric acid solution containing from about 50 to about 90% by weight of sulfuric acid in an amount from about 3.6 to about 4.4 volumes of said acid pervolume of said particles for a period of from about 24 to about 72 hours at a temperature of from about 18° C. to about 40° C. to form a salt of the acid which dissolves in the leach solution,
   separating the so treated particles from said mineral solution,
   washing the particles separated from said acid solution in water prio to removing oil contaminant from said particles,
   removing oil contaminant material from the so treated particles by contacting then with a solvent composition selected from the group consisting of organic solvents and solvent mixtures and mixtures of water and a water miscible solvent and solvent mixtures under such conditions that the oil contaminant passes into solution in said liquid composition,
   separating the so treated particles from said liquid composition,
   removing said amorphous silica from said particles by leaching them with a caustic soda solution containing from about 100 to about 150% by weight of the stoichmetric amount of soda required to form sodium metasilicate from the amorphous silica present in said particles,
   separating the so treated particles from said caustic solution by boiling said particles in said caustic solution until substantially all of the amorphous silica present has reacted so as to recover separated adsorbent, absorbent particles and a sodium silicate solution.

2. A process as claimed in claim 1 wherein:
said particles are treated with a 14.4N sulfuric acid solution in an amount of 4 parts by volume of said solution per part by volume of said particles.

3. A process for treating sericitic clay particles so as to produce an adsorbent, absorbent inorganic product which comprises:
said clay particles are of $-325$ mesh standard Tyler screen size,
removing the alumina from said particles by leaching them with a hydrochloric acid solution containing from about 12 to about 25% by weight of hydrochloric acid in an amount from about 3.6 to about 4.4 volumes of said acid per volume of said particles for a period of from about 24 to about 72 hours at a temperature of from about 18° C. to about 40° C. to form a salt of the acid which dissolves in the leach solution,
separating the so treated particles from said mineral acid solution,
washing the particles separated from said acid solution prior to removing oil type material from said particles,
removing oily contaminant material from the so treated particles by contacting them with a solvent composition selected from the group consisting of organic solvents and solvent mixtures and mixtures of water and a water miscible solvents and solvent mixtures under such conditions that the oil passes into solution in said liquid composition,
separating the so treated particles from said liquid composition,
removing amorphous silica from said particles by leaching them with a caustic soda solution containing from about 100 to about 150% by weight of the stoichmetric amount of soda required to form sodium meta-silicate from the amorphous silica present in said particles,
separating the so treated particles from said caustic solution boiling said particles in said caustic solution until substantially all of the amorphous silica present has reacted so as to recover separated adsorbent, absorbent particles and a sodium silicate solution.

4. A process as claimed in claim 3 wherein:
said particles are treated with a 6N hydrochloric acid solution in an amount of 4 parts by volume of said solution per part by volume of said particles.

* * * * *